(12) United States Patent
Le Floch et al.

(10) Patent No.: US 8,379,670 B2
(45) Date of Patent: Feb. 19, 2013

(54) METHOD AND DEVICE FOR TRANSMITTING VIDEO DATA

(75) Inventors: Hervé Le Floch, Rennes (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 1349 days.

(21) Appl. No.: 11/939,846

(22) Filed: Nov. 14, 2007

(65) Prior Publication Data

US 2008/0130739 A1 Jun. 5, 2008

(30) Foreign Application Priority Data

Nov. 15, 2006 (FR) ...................................... 06 54918

(51) Int. Cl.
*H04J 3/16* (2006.01)
*H04J 3/22* (2006.01)
(52) U.S. Cl. .................................. 370/468; 375/240.01
(58) Field of Classification Search .................. None
See application file for complete search history.

(56) References Cited

U.S. PATENT DOCUMENTS

| | | | | |
|---|---|---|---|---|
| 6,058,143 | A * | 5/2000 | Golin | 375/240.16 |
| 6,308,222 | B1 | 10/2001 | Krueger et al. | 709/247 |
| 7,058,200 | B2 | 6/2006 | Donescu et al. | 382/100 |
| 7,292,602 | B1 * | 11/2007 | Liu et al. | 370/468 |
| 8,046,815 | B2 * | 10/2011 | Kim et al. | 725/116 |
| 2001/0036231 | A1 * | 11/2001 | Easwar et al. | 375/240.19 |
| 2002/0013903 | A1 | 1/2002 | LeFloch | 713/176 |
| 2002/0186769 | A1 * | 12/2002 | O'Brien | 375/240.12 |
| 2006/0017814 | A1 * | 1/2006 | Pinto et al. | 348/208.4 |
| 2006/0020710 | A1 * | 1/2006 | Rabenold et al. | 709/236 |
| 2007/0104373 | A1 * | 5/2007 | Liao et al. | 382/190 |
| 2007/0195880 | A1 | 8/2007 | Henocq et al. | 375/240.13 |

OTHER PUBLICATIONS

P. Assuncao et al., "A Frequency-Domain Video Transcoder for Dynamic Bit-Rate Reduction of MPEG-2 Bit Streams", IEEE Transactions on Circuits and Systems for Video Technology, vol. 8, No. 8, pp. 953-967, Dec. 1998.

I. Bajic et al., "Integrated End-to-End Buffer Management and Congestion Control for Scalable Video Communications", Proceedings 2003 International Conference on Image Processing, ICIP-2003, International Conference on Image Processing, vol. 2 of 3, pp. 257-260, Sep. 14, 2003.

J. Khan, et al. Rate Control in an MPEG-2 Video Rate Transcoder for Trasport Feedback based Quality-Rate Tradeoff, Packet Video 2002, Networking and Media Communication Research Laboratories, Department of Computer Science, Kent State University, 233 MSB, pp. 1-13.

* cited by examiner

*Primary Examiner* — Chirag Shah
*Assistant Examiner* — Minh-Trang Nguyen
(74) *Attorney, Agent, or Firm* — Fitzpatrick, Cella, Harper & Scinto

(57) ABSTRACT

This method allows the transmission of coded data representing a sequence of digital images. A predetermined quantity of this data is stored in a buffer before transmission over a communication network. The method comprises a step of determining a subset of data in the buffer to be transcoded, as a function of at least one quantity representing the bandwidth available for the communication network.

13 Claims, 5 Drawing Sheets calculation of X1

METHOD AND DEVICE FOR TRANSMITTING VIDEO DATA

The present invention relates to a method and device for transmitting video data.

It belongs to the field of video compression and transmission on a network.

As shown in FIG. 1, the situation envisaged by the present invention is as follows. An initial video 100 is compressed by a video coder 101 in order to be transmitted over a network, from a server to a client.

The video coder can be an MPEG1, 2, 4, Motion JPEG or H264 coder. However, in the context of the present invention, it is assumed that this coder is not a so-called scalable coder. This is the case with H264 or with certain MPEG2 or MPEG4 profiles.

The bitstream 102 is divided into packets in a unit 103 before being temporarily stored in a buffer 104.

A network analysis module 107 measures the bandwidth available between the server and client. This bandwidth measurement is transmitted to a flow control module 105 that will flow these packets to a network card 109, complying with a bandwidth constraint B(t) (t designating the current time) calculated by the analysis module 107.

This bandwidth measurement is generally calculated regularly, according to the frequency of reception of the RTCP packets. In certain cases, an RTCP packet is received every second. Because of this, abrupt drops in the bandwidth found at the output from the network card 109 are not always taken into account.

Subsequently it may happen that the network card buffer saturates and blocks the flow of packets through the module 105. The bandwidth figure B(t) given by the analysis module 107 is then no longer complied with.

The actual flow measurement is made by a flow measurement module 106 and is transmitted to a throughput control module 108 that will code the video according to the state of the buffer 104 and the flow speed measured by the module 106.

For each new image the throughput control module 108 takes into account the measurement of bandwidth B(t) supplied last by the flow measurement module 106 and the filling level l(t) of the buffer 104.

However, this flow measurement may drop continually. In such a case, the value given to the throughput control module 108 is different from the true video transmission value. This is because the available bandwidth value may vary greatly during the lapse of time necessary for coding an image. The throughput control module 108 taking its value before the coding of the image, this value may differ from reality at the end of coding of the image. In this case, the level of the buffer 104 may increase dangerously to the point of overflowing.

The video coder must therefore arrange to compress the video with a maximum quality whilst avoiding overflow of the buffer 104. The more the buffer is filled, the greater must be the compression ratio applied to the images. In the case of saturation of the buffer, certain images may not be coded.

This leads to the application of an excessive compression ratio for the new images in order to prevent overflow of the buffer.

Various solutions to this problem have been proposed, none of which however is judged to be satisfactory.

In particular, the article by I. V. BAJIC et al. entitled "*End-to-End Buffer Management and Congestion Control for Scalable Video Communication*", ICIP 2003, uses the progressive mode of a video coder. The packetization takes into account the base layer, deemed to be of priority and placed in priority packets, and the enhanced layer, deemed to be optional and placed in packets of less importance. In the case of overflow of the output buffer, the non-priority packets are simply eliminated. This solution is not suitable in the context of the present invention, that is to say in the case of a non-progressive video coder, since direct elimination of packets would cause significant reconstruction errors.

In the article by J. I. KHAN, Q. GU and R. ZAGHAL entitled "*Rate Control in an MPEG-2 Video Transcoder for Transport Feedback based Quality-Rate Tradeoff*", Packet Video 2002, a router transcodes all the packets coming from a first network to a second network. The size of the new packets is directly calculated by applying the throughput regulation instructions coming from a TCP protocol. However, this solution does not envisage the presence of an image buffer since all the packets are transcoded on the fly. However, not all the packets are necessarily transcodable, according to their content and the transcoding time required.

Finally, the article by P. A. A. ASSUNCAO and M. GHANBARI entitled "*A Frequency-Domain Video Transcoder for Dynamic Bit-Rate Reduction of MPEG-2 Bit Streams*", IEEE Transactions on Circuits and Systems for Video Technology, vol. 8, no, 8, December 1998, proposes an image transcoding algorithm in which an MPEG flow is taken as an input and, as in the article previously cited, all the images are transcoded.

The aim of the present invention is to remedy the aforementioned drawbacks.

For this purpose, the present invention proposes a method of transmitting coded data representing a sequence of digital images, a predetermined quantity of this data being stored in a buffer before transmission over a communication network, this method being remarkable in that it comprises a step of determining a subset of data in the buffer to be transcoded, according to at least one quantity representing the bandwidth available for the communication network.

Thus the invention makes it possible to release space in the buffer by transcoding and reduction of the information associated with a subset of images. Consequently, the compression of new images is not as great as when the buffer was close to overflow, thus affording better homogeneity of quality of the images transmitted.

According to a particular characteristic, the determination step includes a substep of calculating a pair of parameters (K,X1) where the parameter K represents the index of the first image to be transcoded and X1 represents the number of images to be transcoded.

This makes it possible to calculate the maximum number of images that can be transcoded and thus to obtain more space in the buffer for coding new images. This subsequently makes it possible to obtain a more constant image quality.

According to a particular characteristic, the step of calculating the pair of parameters (K,X1) includes a step consisting of calculating the value of K as low as possible and the value of a parameter X as high as possible so as always to have $i(t)<n(t)$, X being the number of images that it is possible to transcode, $i(t)$ designating the index of the image currently being transmitted as a function of time and $n(t)$ designating the index of the image currently being transcoded as a function of time.

This makes it possible to prevent the transcoding interfering with the transmission: in this way for example, transcoding an image that is in the course of transmission is avoided. This is because, if such were the case, either the transcoding could not be carried out or the transmission would have to be interrupted, which would cause a delay in reception.

According to a particular characteristic, the index $n(t)$ of the image currently being transcoded is given by:

$$n(t) = i + K + \left\lfloor \frac{t - t_0}{t_1} \right\rfloor \text{ if } t_0 \le t < t_0 + X \cdot t_1$$

where the sign $\lfloor \; \rfloor$ designates the integer part, $t_0$ designates the decision time where the number X1 of images to be transcoded is estimated, i designates the image currently being transmitted at time $t_0$, and $t_1$ designates the duration of transcoding of an image.

The above equation helps to prevent interference between transcoding and transmission.

According to a particular characteristic, when the data is transmitted by a network card, the quantity representing the available bandwidth is a flow measurement of the network card.

It is a measurement of the bandwidth that may prove to be more precise than the value of the bandwidth estimated only from the RTCP packets supplied by the network analysis module 107 in FIG. 1.

In a particular embodiment, the data to be transcoded are packets corresponding to blocks of images that are not used for coding other images in the sequence of images.

This makes it possible to avoid problems of drift. This is because, if an image A used as a reference by another image B during coding is transcoded, the coding of this other image B is no longer optimal and artifacts may be visible. These artifacts may be eliminated by compensating for the transcoding drift. However, in this case, the image B must also be transcoded. The calculation cost is then higher. Transcoding an image that does not serve as a reference is therefore less expensive and avoids having to take into account problems of drift propagation.

In another particular embodiment, the data to be transcoded are images in the sequence of images.

In this last embodiment, the last image to be transcoded is situated in front of an image coded in "intra" mode in the image sequence.

This guarantees that the transcoding applied does not give rise to drift on the images that will subsequently become coded (for which the drift will not be able to be compensated) and which are not yet in the buffer. This is because it is considered that it is possible to act only on the images in the buffer. The coder will therefore not be informed that images in the buffer have been modified. If the image currently being coded depends (directly or indirectly) on an image in the buffer, a drift will arise during the decoding of this image. It is therefore preferable not to transcode images in the buffer memory that will serve for the coding of the image currently being coded. The oldest image in the buffer that has dependency with respect to the image currently being coded being the last intra image in the buffer, it is appropriate to stop the transcoding just before this image: drift is thus prevented.

For the same purpose as indicated above, the present invention also proposes a device for transmitting coded data representing a sequence of digital images, a predetermined quantity of this data being stored in a buffer before transmission over a communication network, this device being remarkable in that it comprises a module for determining a subset of data of the buffer to be transcoded as a function of at least one quantity representing the bandwidth available for the communication network.

Still for the same purpose, the present invention also proposes a telecommunication system comprising a plurality of terminal devices connected over a telecommunication network, comprising at least one terminal device equipped with a transmission device as briefly described above.

Still for the same purpose, the present invention also relates to an information storage means that can be read by a computer or microprocessor storing instructions of a computer program, remarkable in that it enables a transmission method as briefly described above to be implemented.

In a particular embodiment, this storage means is partially or totally removable.

Still for the same purpose, the present invention also relates to a computer program product to be able to be loaded into a programmable apparatus, containing sequences of instructions for implementing a transmission method as briefly described above, when this program is loaded into and executed by the programmable apparatus.

Still for the same purpose, the present invention also provides a method of transmitting coded data representing a sequence of digital images, a predetermined quantity of those data being stored in a buffer memory before transmission over a communication network, the method comprising a step of determining the number of images in the buffer memory to be transcoded, as a function of a quantity representing the bandwidth available for the communication network and a quantity representing a size of the images already coded and present in the buffer memory.

Such transmission method has advantages similar to those of the transmission method succinctly described previously.

The particular characteristics and advantages of the transmission device, of the telecommunication system, of the information storage means and of the computer program product being similar to those of the transmission methods, they are not repeated here.

Other aspects and advantages of the invention will emerge from a reading of the following detailed description of a particular embodiment, given by way of non-limiting example. The description refers to the drawings that accompany it, in which:

FIG. 1, already described, depicts schematically the context of the present invention;

Figure 2:
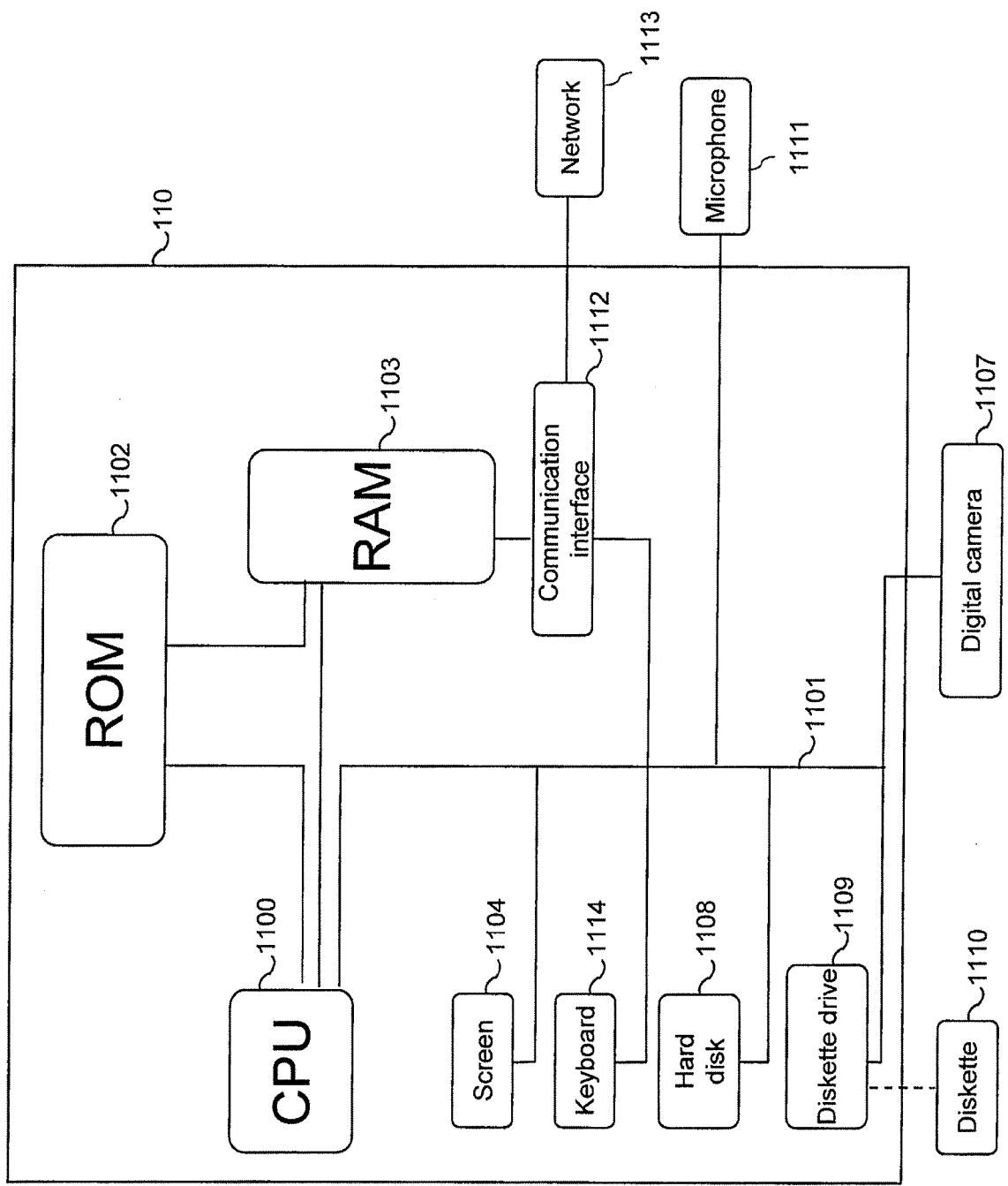
FIG. 2 depicts schematically a particular embodiment of an apparatus able to implement the present invention.

As depicted in FIG. 2, a device implementing the invention is for example a microcomputer 110 connected to various peripherals, for example a digital camera 1107 (or a scanner, or any image acquisition or storage means) connected to a graphics card and supplying information to be processed according to the invention.

The device 110 has a communication interface 1112 connected to a network 1113 able to receive digital data to be processed or conversely to transmit data processed by the device.

The device 110 also comprises a storage means 1108 such as a hard disk. It also comprises a drive 1109 for disks 1110. This disk 1110 may be a diskette, a CD-ROM, or a DVD-ROM, for example. The disk 1110, like the disk 1108, may contain data processed according to the invention as well as the program or programs implementing the invention which, once read by the device 110, will be stored on the hard disk 1108. In a variant, the program or programs enabling the device to implement the invention can be stored in read only memory 1102 (called ROM on the drawing). In another variant, this program or programs can be received so as to be stored in an identical fashion to that described above by means of the communication network 1113.

The device 110 is connected to a microphone 1111. The data to be processed according to the invention will in this case be audio signal.

This same device has a screen 1104 for displaying the data to be processed or serving as an interface with the user, who can thus parameterize certain processing modes, by means of the keyboard 1114 or any other means (a mouse for example).

The central unit 1100 (called CPU on the drawing) executes the instructions relating to the implementation of the invention, instructions stored in the read only memory 1102 or in the other storage elements. On powering up, the processing programs stored in a non-volatile memory, for example the ROM 1102, are transferred into the random access memory RAM 1103, which will then contain the executable code of invention as well as registers for storing the variables necessary for implementing the invention.

In more general terms, an information storage means that can be read by a computer or a microprocessor, integrated or not into the device, possibly totally or partially removable, stores a program implementing the transmission method.

The communication bus 1101 affords communication between the various elements included in the microcomputer 110 or connected to it. The representation of the bus 1101 is not limiting and in particular the central unit 1100 is able to communicate instructions to any element of the microcomputer 110 directly or by means of another element of the microcomputer 110.

Figure 3:
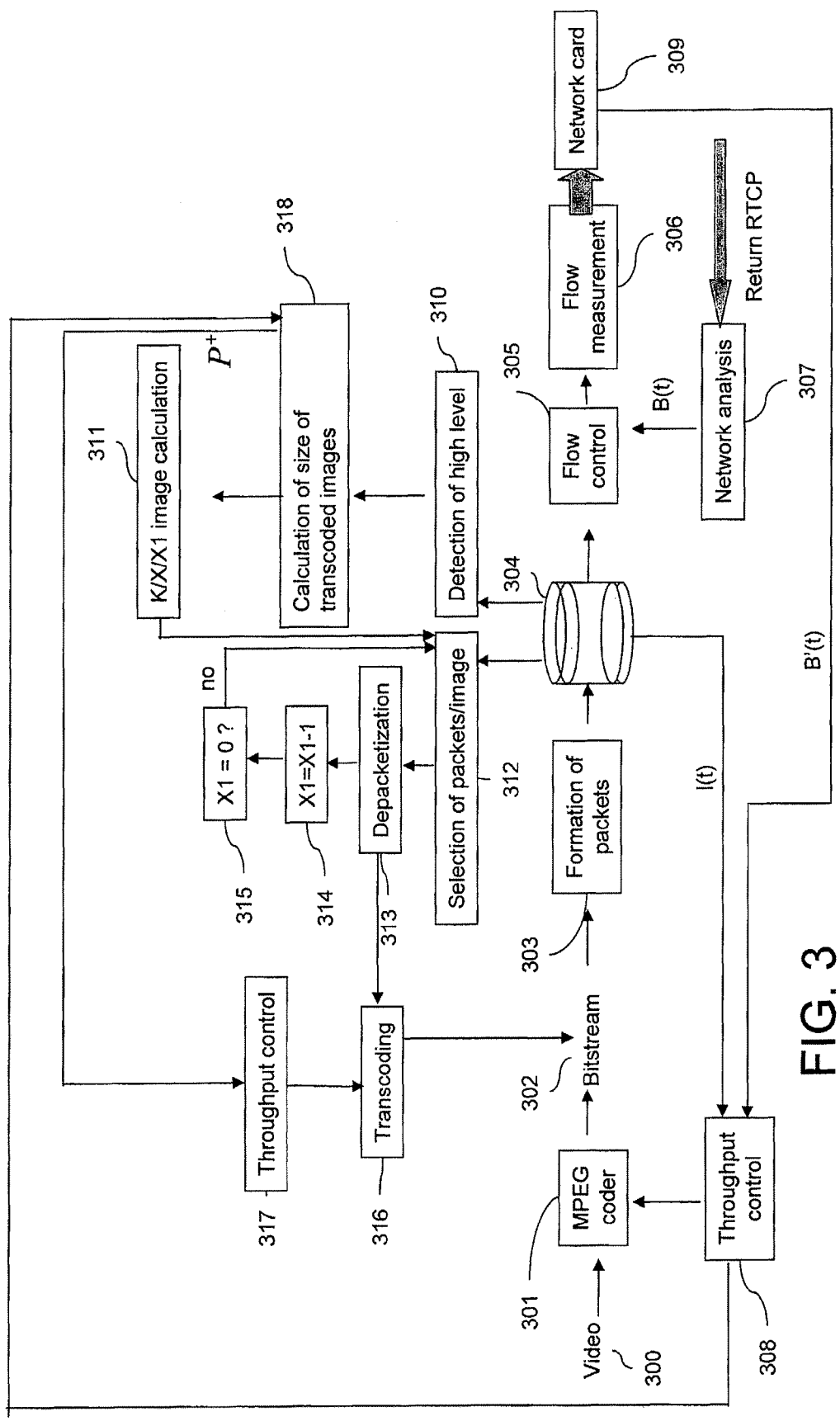
FIG. 3 depicts schematically a particular embodiment of the present invention.

FIG. 3 illustrates a particular embodiment of the invention. A video 300 is coded by a coder 301, for example an MPEG coder, in the form of a bitstream 302. From this bitstream, packets are made up by a packet formation module 303 (also referred to as "packetization", the reverse operation being called "depacketization") and placed in a buffer 304 of the network.

A flow control module 305 controls the flow of the packets to a network card 309 according to the estimation of the bandwidth B(t) made by a network analyzer 307.

The throughput control module 308 calculates the size of the new images according to the filling level l(t) of the buffer 304 and the bandwidth B'(t) measured by a flow measurement module 306.

In accordance with the present invention, when a high level of the buffer 310 is detected, the pair (K,X1) for selecting the images 311 in the buffer 304 that will be transcoded by a transcoding module 316 is calculated. The value of K represents the index of the first image in the buffer to be transcoded. The parameter X1 represents the number of images to be transcoded. As described below, it is necessary to calculate a value X and then the value of X1 is derived from that of X.

Transcoding consists of reducing the size of the images already coded and present in the buffer 304. After transcoding, the size of these images will be smaller, releasing space for the new images to be coded by the coder 301 and thus allowing better homogeneity of the quality of the coded images.

When the high level of the buffer has been detected by a high level detection module 310, the target average size of the images to be transcoded is fixed in a module 318 for calculating the size of the transcoded images. The value of this average size is denoted $P^+$. This value will be the new compressed size of the images.

The pair of values (K,X1) is then calculated, the packets/images to be transcoded are selected by a selection module 312, depacketized by a depacketization module 313 and transcoded by the transcoding module 316, complying with the bandwidth value $P^+$ by virtue of a throughput control module 317. The transcoding is a transcoding in terms of quality. It does not consist of eliminating images. The quality of the images selected is only reduced.

The method of calculating the values of the parameters K and X1 will be described below with reference to FIG. 4, which illustrates an example where the video compression scheme of the coder 301 codes the images independently (an image is said to be independent if it is not used as a reference by other images in the video coder: this is the case for example with images coded with Motion JPEG, or images said to be bi-directional in the MPEG standard) and with reference to FIG. 5, which illustrates an example where images can be coded dependently (for example the Inter images of MPEG1, 2, 4 etc).

Firstly, it is necessary to calculate a value X, which represents the number of images that it is possible to transcode. Therefore a way of calculating X is described first of all. Next, for reasons of feasibility, only a subset X1 of these X images can be transcoded. In the context of FIG. 4, X=X1. On the other hand, in the case of FIG. 5, X and X1 will have two different values.

The calculation of X involves fixing the value $P^+$ of the target average size of the images to be transcoded. For this purpose, when the high level of the buffer 304 is detected by the detection module 310, a throughput control module 308 estimates the size of the new images to be coded according to this high level. This size is denoted $P_0$. As the buffer 304 is almost full, this value is very small. The compression ratio is high. This value $P_0$ is the value that the throughput control module 308 would have calculated.

The average size of the images already coded and present in the buffer 304 being denoted $P^-$, the value:

$$P^+ = \frac{P_0 + P^-}{2}$$

is fixed.

It is assumed here that $P_0 < P^-$, since the compression ratio becomes higher, the closer the buffer is to overflow. The new size of the images $P^+$ will therefore be less than the former average size $P^-$ and additional space will be released in the buffer. The pair (K,X) is then calculated as follows.

It is appropriate to ensure that the image that is currently being transcoded is not transmitted before the end of the transcoding operation. For this purpose, the indices i(t) of the images currently being transmitted are calculated (as a function of time) and the indices n(t) of the images currently being transcoded are calculated (as a function of time).

In accordance with the present invention, the value of K is calculated as small as possible and the value of X as large as possible so that always:

$$i(t) < n(t)$$

This guarantees that the device is always in a position to transmit the images in sequential order and that sufficient time is left for transcoding.

FIG. 3 shows that the network card flow measurement is performed by the flow measurement module 306. This value is known at any time and is denoted B'(t).

Figure 1:
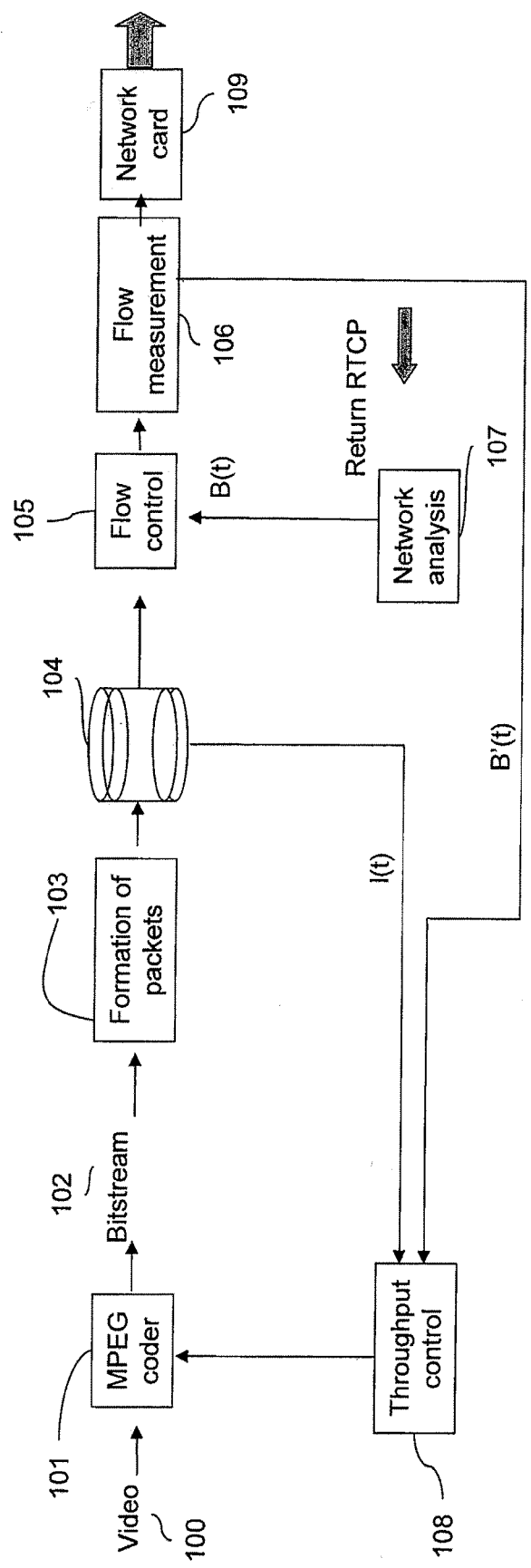

In theory, the flow value B'(t) should correspond to the estimated bandwidth of the network. The buffer 104 in FIG. 1 is in fact open at the speed corresponding to the bandwidth of the network B(t). However, in some cases, a packet issuing from the buffer 104 and transmitted to the network card cannot be directly transmitted over the network. This is because it may happen that the network card 109 is not in a position to flow a packet received since the network does not so allow. In this case, when the internal buffer of the network card is full, the packet issuing from the buffer 104 is refused and remains in this buffer as long as the internal buffer of the network card 109 is full. Because of this, the speed of flow is less than or equal to the bandwidth estimated by the analysis module 107.

As the size of each coded or transcoded image is known, it is possible at any moment to know which image is currently being transmitted.

If t=0 is the start time of the video transmission, the index i of the image currently being transmitted (at time t) satisfies the equation:

$$i = \max_{z \in N}(z) \text{ such that } \int_0^t B'(s)ds = B'(t) \cdot t > \sum_{k=0}^{z-1} S(k)$$

where N designates all the positive integers and S(i) is the size of the $i^{th}$ coded image. At the decision time $t_0$ where the number of images to be transcoded is estimated, it is appropriate to evaluate in the course of time (in the future) the indices n(t) of the images transmitted. These indices are evaluated as follows:

$$i(t) = \max_{z \in N}(z) \text{ such that } B'(t_0).(t - t_0) > \sum_{I=i}^{z-1} S(I)$$

where S(I) is the size of the coded or transcoded image. i is the index of the image currently being transmitted at time $t_0$. This will give:

S(I)=$P^+$ if i+K≤I≤i+K+X; otherwise S(I) will have the size of the image initially coded.

The index of the image that is transcoded is given by:

$$n(t) = i + K + \left\lfloor \frac{t - t_0}{t_1} \right\rfloor \text{ if } t_0 \leq t < t_0 + X.t_1$$

where the sign $\lfloor \ \rfloor$ designates the integer part and $t_1$ designates the duration of transcoding of an image.

The calculation described above can easily be simulated by a machine.

In the particular embodiment described here, only the buffer 304 of the server is taken into account. Nevertheless, in accordance with the present invention, it would just as easily be possible to take into account the buffer of the client or other parameters.

Figure 4:
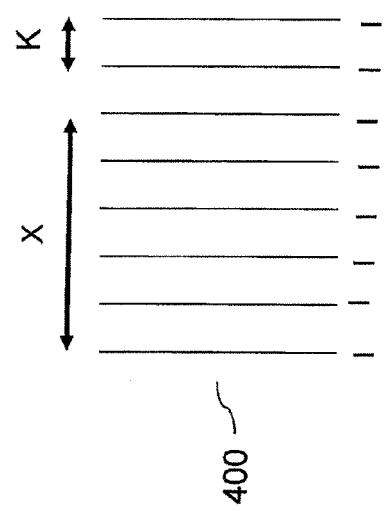
FIGS. 4 and 5 illustrate non-limiting examples of the determination of a subset of images to be transcoded in accordance with the present invention.

FIG. 4 illustrates under the reference 400 a possible state of the buffer 304. In this example, the state of the buffer is depicted in the form of images in order to simplify the explanation of the reasoning made. It can be seen that all these images are Intra images (represented by the letter "I" in the drawing). These images are therefore independent of one another. They can come either from a Motion-JPEG coder, which does not use temporal redundancy, or an MPEG coder, which uses only Intra images. In this case, X1=X.

Although the buffer has been shown in the form of images, it is in reality composed of data packets. Even if the calculation of a value of X based on images was described above, the same reasoning can be made at packet level.

Figure 5:
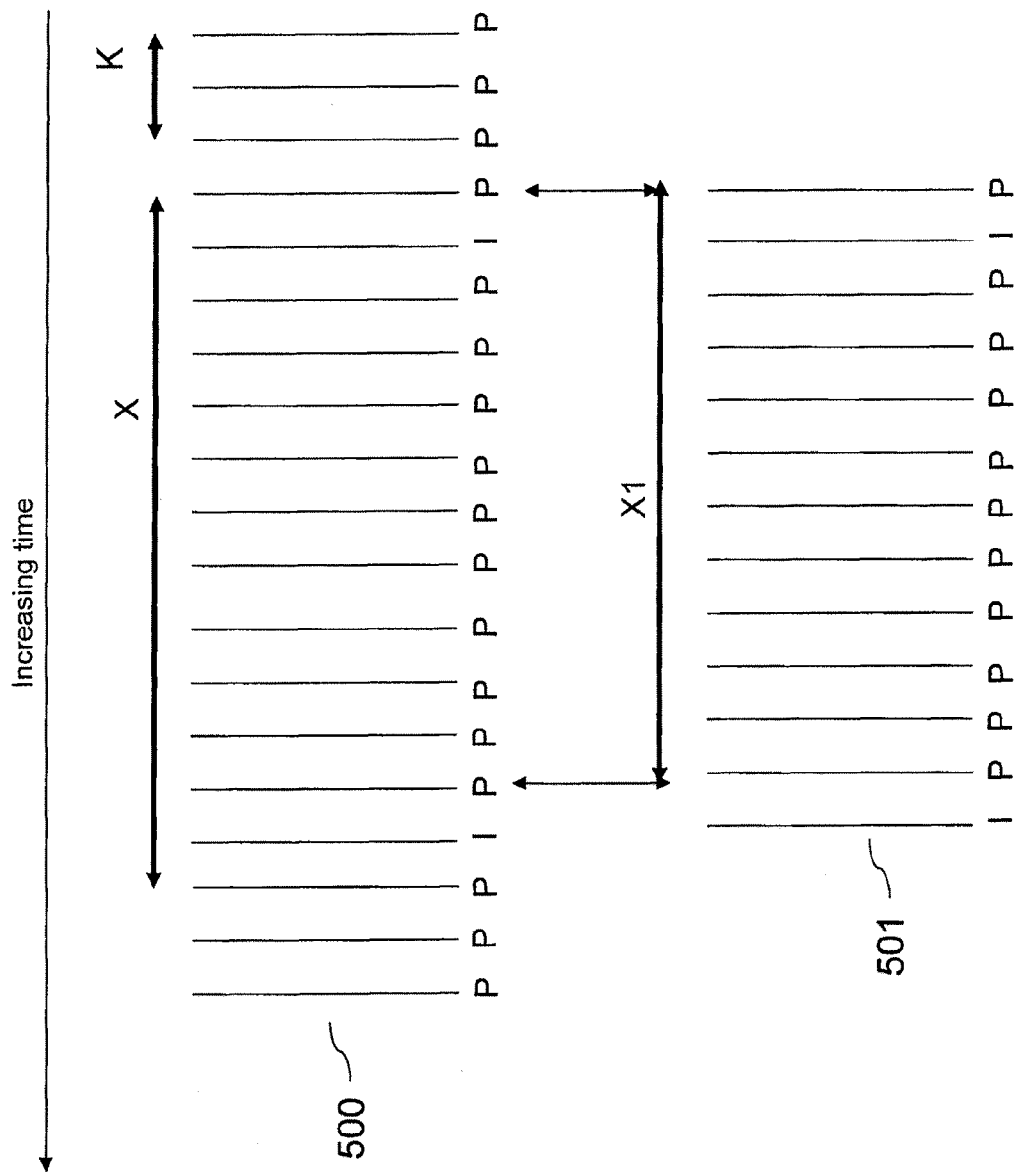

FIG. 5 illustrates, under the reference 500, a possible state of the buffer 304. In this example, the state of the buffer is shown in the form of Intra images (designated by the letter "I" on the drawing) and Inter images (designated by the letter "P"). An Intra image is a self-contained image. It can be decoded without the use of previous images. An Inter image is a predicted image. Its reconstruction or decoding depends on a reference image.

The transcoding can commence on any type of image. This is because transcoding algorithms exist and can take into account the effect of requantization on subsequent images. On the other hand, transcoding cannot end just anywhere. It must end just before an Intra image. If such is not the case, a transcoding error may exist.

Because of this, the X images will not be transcoded. Only X1 images will be selected and the last image selected will be situated before an Intra image. The X1 images to be transcoded are illustrated under the reference 501.

We claim:

1. A method of transmitting coded data representing a sequence of digital images, a predetermined quantity of said data being stored in a buffer memory before transmission over a communication network, said method comprising a step of determining a subset of data representing a subset of successive images of the sequence of digital images in said buffer memory to be transcoded, as a function of at least one quantity representing a bandwidth available for said communication network;
    wherein the determination step comprises a sub-step of calculating a pair of parameters (K,X1) where the parameter K represents the index of the first image to be transcoded and X1 represents the number of images to be transcoded.

2. A method according to claim 1, wherein said step of calculating the pair of parameters (K,X1) comprises a step consisting of calculating the value of K as small as possible and the value of a parameter X as large as possible so as always to have i(t)<n(t), X being the number of images that it is possible to transcode, i(t) designating the index of the image currently being transmitted as a function of time and n(t) designating the index of the image currently being transcoded as a function of time.

3. A method according to claim 2, wherein the index n(t) of the image currently being transcoded is given by:

$$n(t) = i + K + \left\lfloor \frac{t - t_0}{t_1} \right\rfloor \text{ if } t_0 \leq t < t_0 + X.t_1$$

where the sign $\lfloor \ \rfloor$ designates the integer part, $t_0$ designates the decision time where the number X1 of images to be transcoded is estimated, i designates the index of the image currently being transmitted at time $t_0$ and $t_1$ designates the duration of transcoding of an image.

4. A method according to claim 1, wherein, when the data is transmitted by a network card, the quantity representing the available bandwidth is a measure of flow of the network card.

5. A method according to claim 1, wherein the data to be transcoded are packets corresponding to blocks of images that are not used for the coding of other images in the sequence of images.

6. A method according to claim 1, wherein the data to be transcoded are images in the sequence of images.

7. A method according to claim 6, wherein the last image to be transcoded is situated before an image coded in "Intra" mode in the sequence of images.

8. An information storage means readable by a computer or a microprocessor storing instructions of a computer program, allowing the implementation of a transmission method according to claim 1.

9. An information storage means according to claim 8, being partially or totally removable.

10. A device for transmitting coded data representing a sequence of digital images, a predetermined quantity of said data being stored in a buffer memory before transmission on a communication network, said device comprising:
- means for determining a subset of data representing a subset of successive images of the sequence of digital images in said buffer memory to be transcoded, as a function of at least one quantity representing a bandwidth available for said communication network, wherein said determination means comprise means of calculating a pair of parameters (K,X1) where the parameter K represents the index of the first image to be transcoded and X1 represents the number of images to be transcoded; and
- transmission means for transmitting coded data.

11. A device according to claim 10, wherein said means of calculating the pair of parameters (K,X1) comprise means for calculating the value of K as small as possible and the value of a parameter X as large as possible so as always to have $i(t) < n(t)$, X being the number of images that it is possible to transcode, i(t) designating the index of the image currently being transmitted as a function of time and n(t) designating the index of the image currently being transcoded as a function of time.

12. A non-transitory computer program product loadable into a programmable apparatus, comprising sequences of instructions for implementing a transmission method when said program is loaded into and run by said programmable apparatus, the transmission method for transmitting coded data representing a sequence of digital images, a predetermined quantity of said data being stored in a buffer memory before transmission over a communication network, said transmission method comprising a step of determining a subset of data representing a subset of successive images of the sequence of digital images in said buffer memory to be transcoded, as a function of at least one quantity representing a bandwidth available for said communication network;
- wherein the determination step comprises a sub-step of calculating a pair of parameters (K,X1) where the parameter K represents the index of the first image to be transcoded and X1 represents the number of images to be transcoded.

13. A method of transmitting coded data representing a sequence of digital images, a predetermined quantity of said data being stored in a buffer memory before transmission over a communication network, said method comprising a step of determining a number of images of the sequence of digital images in said buffer memory to be transcoded, as a function of a quantity representing a bandwidth available for said communication network and a quantity representing a size of the images already coded and present in said buffer memory;
- wherein the determination step comprises a sub-step of calculating a pair of parameters (K,X1) where the parameter K represents the index of the first image to be transcoded and X1 represents the number of images to be transcoded.

* * * * *